United States Patent [19]
Möller

[11] Patent Number: 5,609,061
[45] Date of Patent: Mar. 11, 1997

[54] TURNTABLE WITH STEPPING DRIVE

[75] Inventor: Reinfried Möller, Weinheim, Germany

[73] Assignee: Expert Maschinenbau GmbH, Germany

[21] Appl. No.: 636,023

[22] Filed: Apr. 22, 1996

Related U.S. Application Data

[63] Continuation of Ser. No. 343,553, filed as PCT/EP94/00368 Feb. 9, 1994 published as WO94/22637 Oct. 13, 1994.

[30] Foreign Application Priority Data

Apr. 2, 1993 [DE] Germany ............... 9305031 U

[51] Int. Cl.⁶ .................................................. F16H 29/04
[52] U.S. Cl. ........................... 74/120; 74/112; 74/820; 384/615; 384/502
[58] Field of Search ................... 74/120, 112, 820, 74/813 R; 384/551, 615, 502, 486, 501

[56] References Cited

U.S. PATENT DOCUMENTS

| | | | |
|---|---|---|---|
| 3,533,309 | 10/1970 | Pityo et al. | 74/813 R |
| 3,633,443 | 1/1972 | Schussler | 74/822 |
| 3,717,352 | 2/1973 | Jansing et al. | 277/34.3 |
| 3,718,055 | 2/1973 | Maier | 74/820 |
| 4,080,849 | 3/1978 | Benjamin et al. | 74/813 R |
| 4,448,093 | 5/1984 | Möller | 74/426 |
| 4,644,825 | 2/1987 | Yamazaki | 74/813 R |
| 5,440,952 | 8/1995 | Nakashima et al. | 74/813 R |

FOREIGN PATENT DOCUMENTS

| | | |
|---|---|---|
| 1296499 | 5/1969 | Germany. |
| 8418414 | 9/1984 | Germany. |
| 4021949 | 9/1991 | Germany. |
| 344965 | 8/1972 | U.S.S.R. . |

*Primary Examiner*—Charles A. Marmor
*Assistant Examiner*—David M. Fenstermacher
*Attorney, Agent, or Firm*—Dvorak and Traub

[57] ABSTRACT

Bearing system for a turntable (10) with a stepping drive, in which a table plate (12) is rotatably mounted on ball bearings on top of a housing (14), having drive pins (36) disposed on the same diameter offset at uniform angular distances and protruding from the bottom of the table plate (12), the drive pins engage a cam groove (34) in a motor-driven roll (32) mounted on the housing, wherein the shape of the cam groove determines the characteristic of the rotary movement of the turntable (12); the table plate being circularly defined, has a diameter that is greater than the associated upper part of the housing (14) that forms the bearing area (40); the part of the table plate (12) reaching radially past the housing is thickened such that it reaches slightly downward over the bearing area (40) of the housing and the races of the rolling bearing for the table plate are formed in the bearing area of the outwardly facing wall of the housing (14). On the margin of the table plate facing downwardly in the bearing area there is removably fastened a bearing ring (50), and in the inner surface of the table plate (10) opposite the races in the housing, races for mounting the rolling bodies (bearing balls 44) are formed partly in the overreaching outer margin area of the table plate and partly in the bearing ring (50).

2 Claims, 4 Drawing Sheets

TURNTABLE WITH STEPPING DRIVE

This application is a continuation of application Ser. No. 08/343,553, filed as PCT/EP94/00368 published as WO94/22637 on Oct. 13, 1994.

BACKGROUND OF THE INVENTION

The invention relates to a bearing system for a turntable with stepping drive, having a table plate journaled on the top of a housing, and having a plurality of driving pins disposed all on the same diameter and projecting from its bottom at uniform angular distances and engaging a groove in a motor-driven cylinder journaled in the housing, the shape of the groove determining the characteristic of the rotation of the table plate.

Stepping turntables of this kind are used in many fields of industrial technology whenever, for example, workpieces are carried successively step by step to various working stations where they are held while being worked, and then must be passed on to the next working station, the working stations being arranged around the table with a uniform angular spacing. The holding means or vises for the workpieces are then mounted on the stepping turntable where they must be held strongly and as free as possible from movement for the achievement of high accuracy. At least in the case of comparatively large units, so-called "wire ball bearings" are used as a rule, in which the bails roll on hardened steel wire rings which thus form the races of the ball bearing. These wire ball bearings have proven useful for heavily loaded rotary bearings of great diameter. In the turntables here in question the configuration has formerly been such that the circularly defined table plate was provided on its outer circumference with a circumferential groove to receive the two wire rings forming the table-side races of the ball bearings, while the wire rings forming the races on the housing side were disposed in the wall of a recess in the housing accommodating the circumference of the turntable on the one hand, and in the circumferential wall facing the turntable plate of a bearing mounting and adjusting ring screwed to the face of the housing. Removing the mounting and adjusting ring by unscrewing it from the housing then permits the bearing to be removed and enables the turntable plate to be lifted away from the turntable housing; then the bearing clearance can be adjusted by inserting spacing shims into the gap between the face of the housing and the confronting surface of the mounting and adjusting ring. It is to be noted in any case that the table plate of the turntable was disposed largely recessed within the housing's bearing area and the mounting and adjusting ring was screwed to the housing. Thus the diameter of the table plate and thus also of the wire bearing is established by the horizontal dimensions of the housing in the bearing area. Between the mounting and adjusting ring and the circumference of the table plate there is also a certain, although narrow, gap through which dirt particles and other contaminants, such as chips, drilling and cooling fluid or the like can penetrate. In applications in which this danger exists, this gap must additionally be covered or sealed off in some suitable manner.

SUMMARY OF THE INVENTION

The invention, on the other hand, is addressed to the problem of creating a bearing system for turntables of the kind here in question, in which the table plate can reach down radially around the housing, i.e., it has a larger workpiece mounting surface, while the bearing system itself is to a lesser extent exposed to the penetration of dirt and the like and can withstand heavier loads.

Setting out from a turntable of the kind referred to above, this problem is solved in accordance with the invention by providing the circularly defined table plate with a diameter that is greater than the associated upper, likewise circularly defined area of the housing that forms the bearing area; that the marginal portion of the table plate extending radially beyond the housing is given a greater thickness downwardly such that, it reaches down partially around the area of the bearing in the housing; that in the radially outward facing wall of the housing, in the bearing area thereof, the housing-side races for the ball bearing of the table plate are formed; that on the downwardly facing surface of the table plate's marginal area reaching downwardly around the housing in the bearing area a bearing ring is releasably fastened, and that in the inside surface of the table plate opposite the races in the housing the races that are situated partially in the outer, turned-down margin of the table plate and partially in the bearing ring are configured so as to contain the ball bearings on the table plate side. Since the turntable plate extends radially beyond the housing, there is no longer any gap permitting the entry of dirt or undesirable fluids into the bearing. The gap is instead on the underside of the table plate between the housing and the bearing ring fastened to the table plate. Since at the same time the bearing diameter is greater than the diameter of the bearings in the known turntables, the load bearing capacity of the bearing is increased, i.e., the ability of the table plate to bear stress is improved, since on the one hand the lever arm of the thrust under load is more favorable, and on the other hand the greater diameter of the bearings supports the load on a greater number of bearing bails.

One special advantage of the invention is that the ball bearing can be set or readjusted under load. This substantially reduces the trouble involved in readjusting the ball bearing while in operation, because articles on the turntable, e.g., a tool plate or individual tools fastened on the turntable no longer have to be dismounted and then reinstalled after the adjustment. This results in a considerable reduction of down time.

The bearings of the turntable according to the invention are preferably configured as wire ball bearings, known in themselves, and then the configuration is so arranged that the races of the bearing on the housing side are formed by two wire rings made of hardened steel and set at different levels into a groove in the upper bearing area of the housing, and so that the table-side races of the bearing are formed by two rings of hardened steel wire at different levels, which are disposed in a groove created partially in the inner side of the table plate's annular turned-down marginal portion facing the housing, and partially in the groove formed in the bearing ring.

BRIEF DESCRIPTION OF THE DRAWINGS

The invention will be explained in the following description of an embodiment in conjunction with the drawing, wherein.

DETAILED DESCRIPTION OF THE INVENTION

Figure 1:
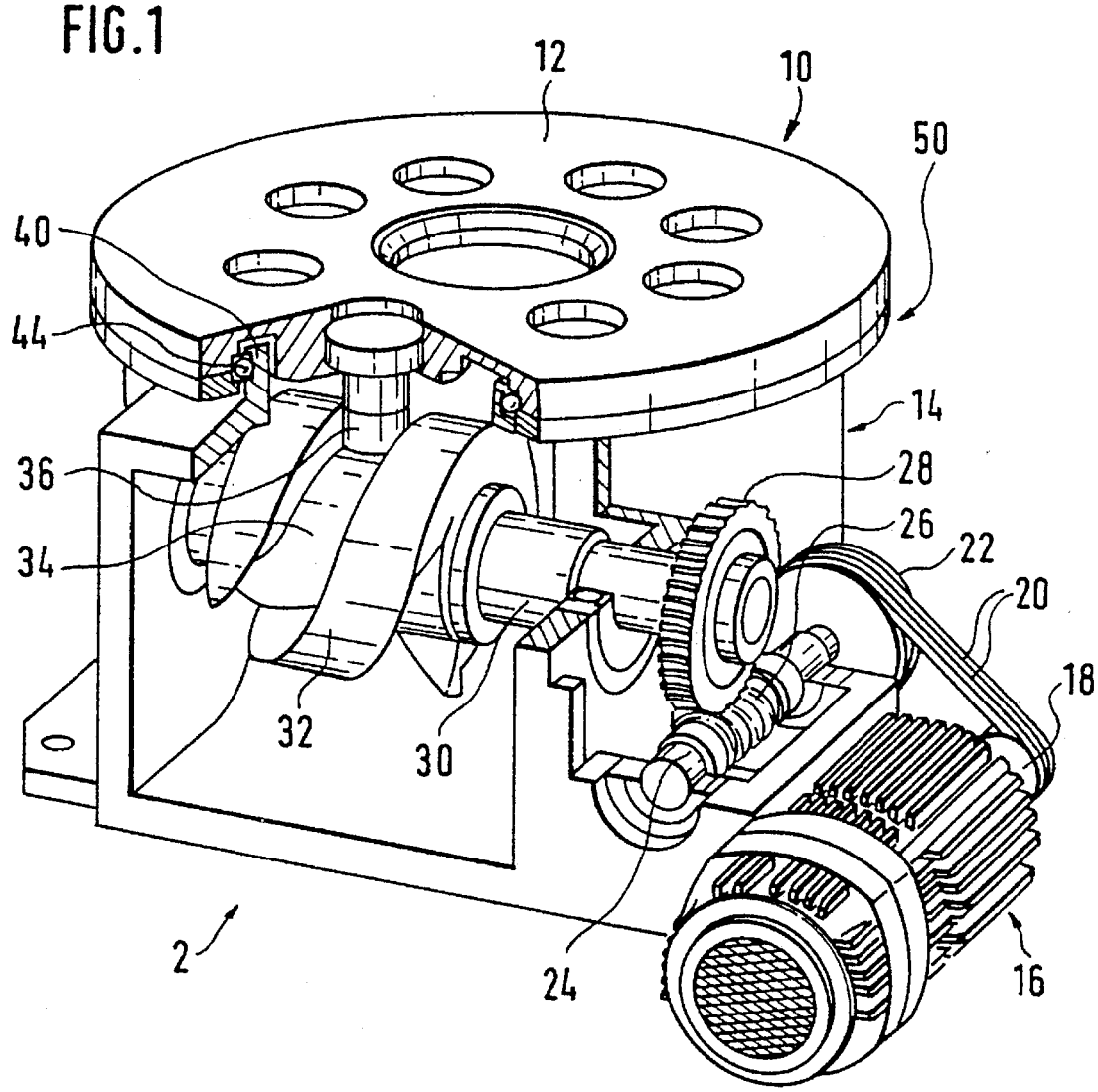
FIG. 1 is a partially cut-away perspective view of a turntable with stepping drive according to the invention.

The turntable shown in FIGS. 1 to 4 and identified as a whole by the number 10 has a circularly defined table plate, substantially flat on the top, which—in the manner described below—is rotatable on the top side of the housing and can be driven by an electric motor 16 mounted externally on the housing 14. V-belt pulleys 18 of relatively small diameter are fastened on the shaft and through V-belts 20 they drive V-belt pulleys 22 of larger diameter. The V-belt pulleys 22 are mounted for rotation with one end of a journaled shaft 24 protruding from the housing 14. The shaft 24 bears the worm 26 of a worm drive serving as a reduction gear, the worm gear 28 of which is disposed at the end of a horizontal shaft 30 journaled in the housing, which in turn bears a drive cylinder 32 into whose basically cylindrical circumference a drive groove 34 is created, into which, when the motor 16 is running, the roller pins 36 of a series of such roller pins 36 arranged at regular intervals and projecting downward into the housing from the table plate 12 enter successively. The length of the drive groove 34 in the drive cylinder 32 is made to be such that, when motor 16 is running, a roller pin 36 introduced into the drive groove and then carried along by the continued rotation of the drive cylinder will exit from the drive groove 34 at one end of the drive cylinder 32 just when the next roller pin 36 enters the drive groove 32 at the opposite end. The motion characteristic of the table plate while a roller pin is passing through the drive groove depends on the shape, i.e., the pitch in each case of the drive groove 34. Stationary periods, when the roller pin is in a section of the groove running circumferentially, can be followed successively by periods of acceleration and retardation and periods of constant velocity, when the roller pin is running in a section with constant pitch. In the turntable 10 shown in FIG. 1 the table plate 12 has eight roller pins, so that during a full rotation the table plate can be accelerated a total of eight times from zero to a constant velocity, and then retarded back to zero, i.e., to a standstill, while the standstill phase can be lengthened by shutting off the motor while workpieces are transferred into and out of receptacles provided on a tool plate fastened on the table plate. The table plate thus rotates step-wise a total of eight times, and in the standstill periods stops precisely at the associated working position or workpiece transfer position, as the case may be.

Figure 2:
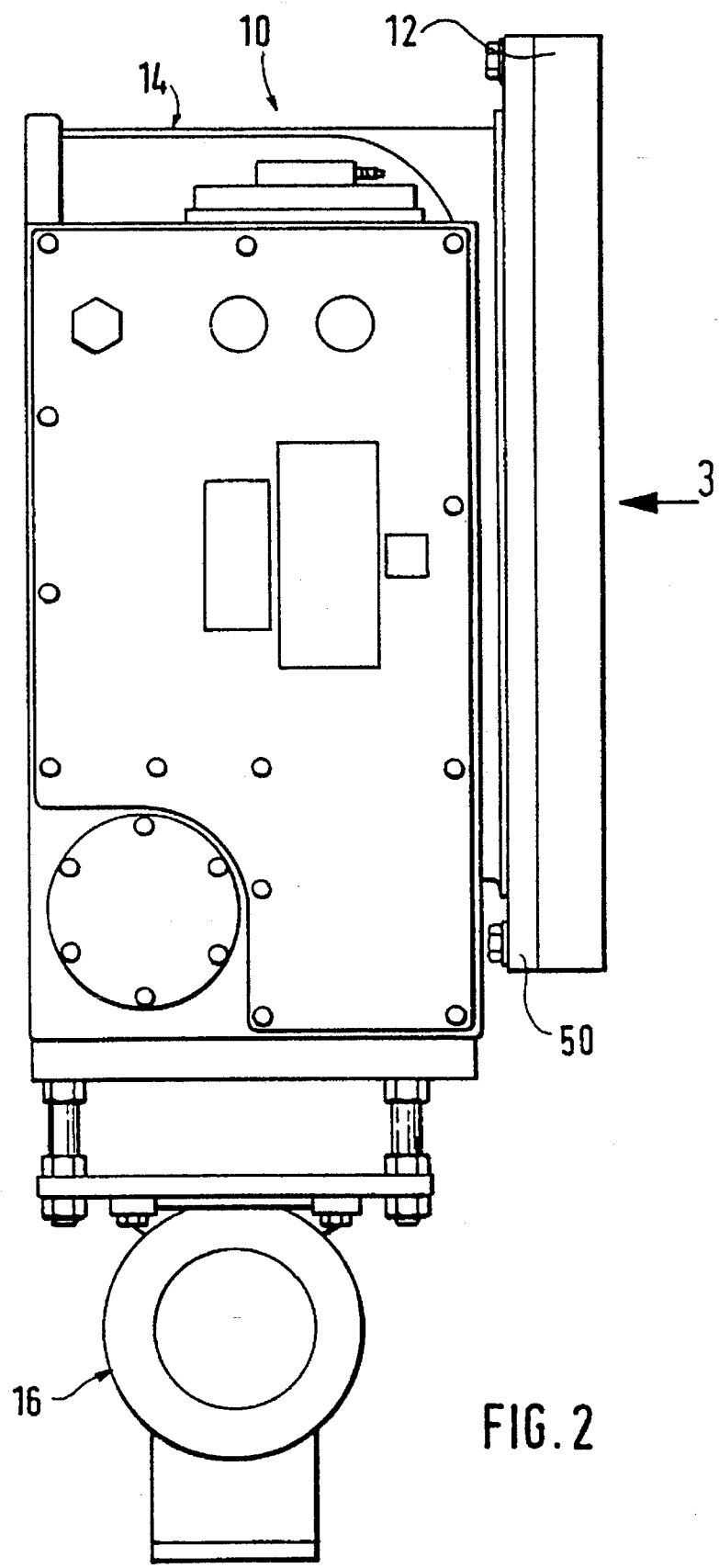
FIG. 2 a side view of the turntable seen in the direction of arrow 2 in FIG. 1.
Figure 3:
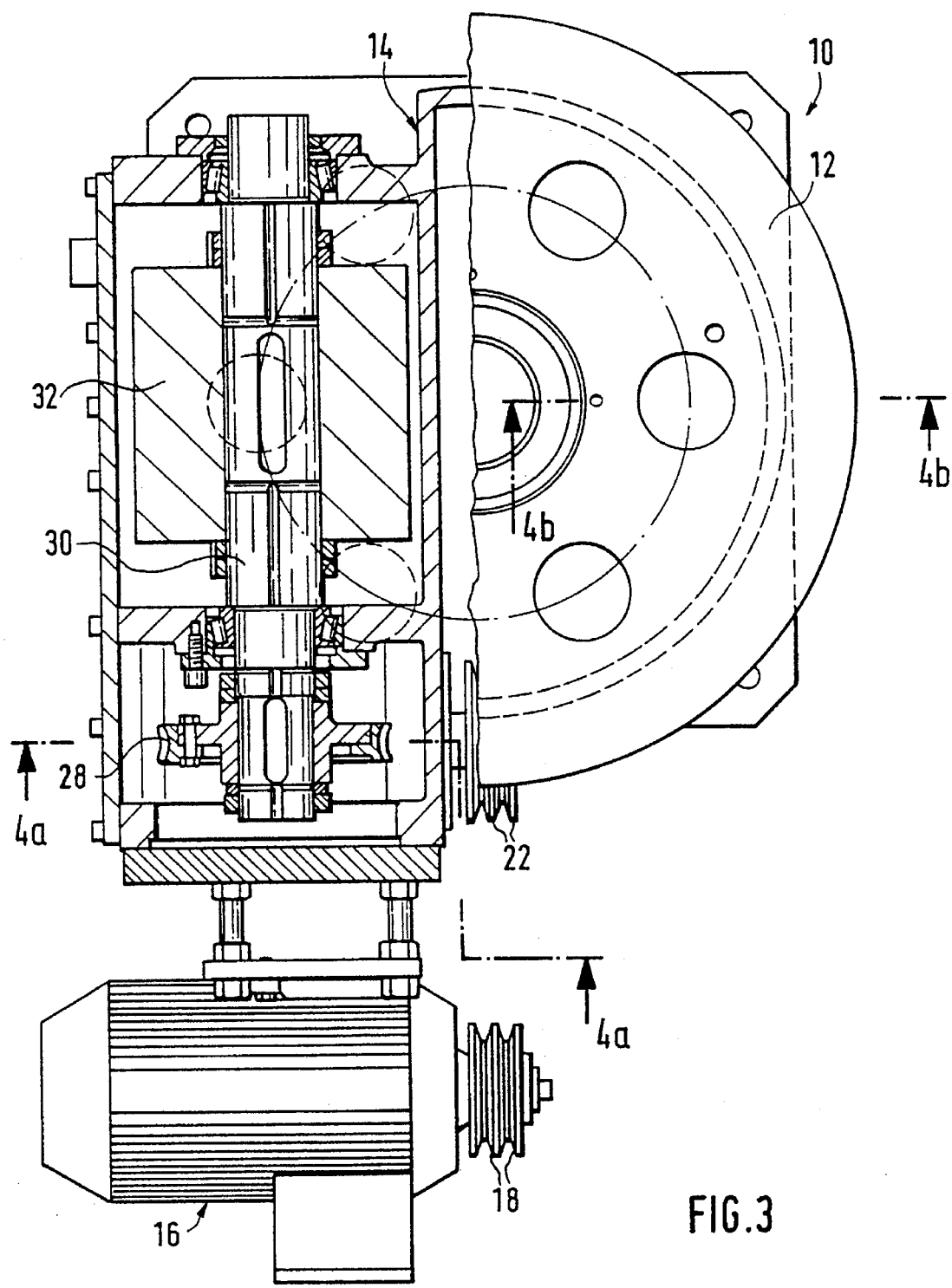
FIG. 3 a top plan view of the turntable, seen in the direction of arrow 3 in FIG. 2, and partially cut away in a horizontal plane passing through the housing.
Figure 4:
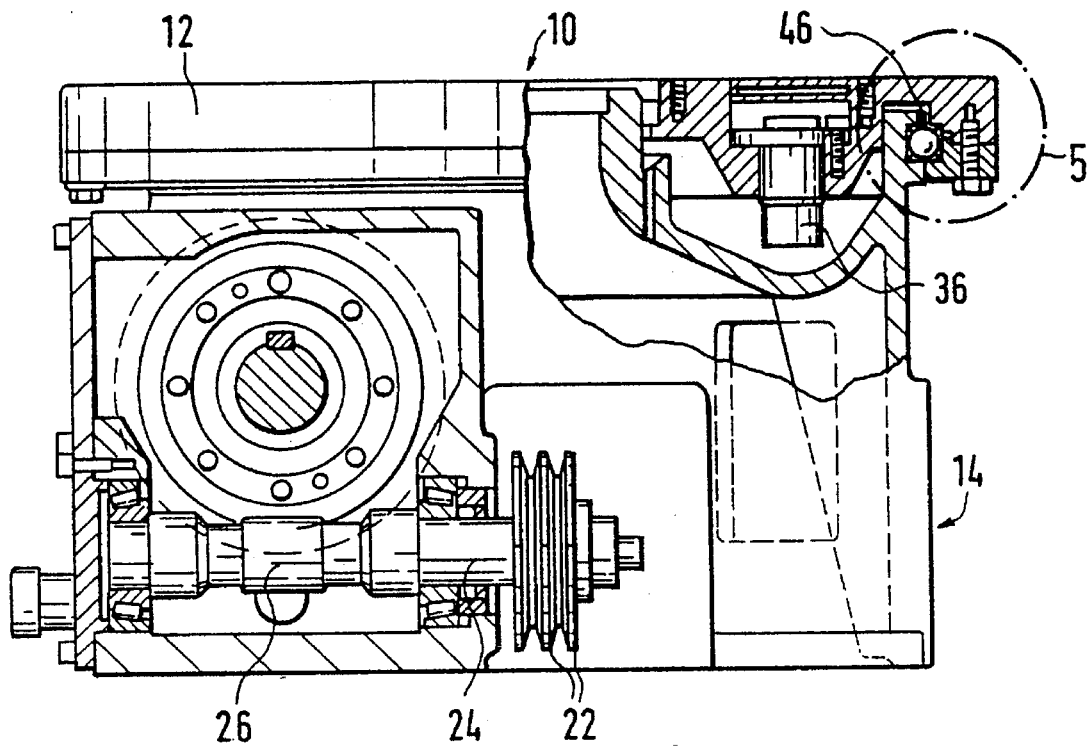
FIG. 4 a partially cut-away elevation of the turntable, seen in the direction of the arrows 4a—4a, wherein the uncut area is partially additionally cut away as seen in the direction of arrows 4b—4b.

In FIGS. 2 to 4 there is shown a modification of the turntable of FIG. 1 to the effect that only 6 roller pins are provided, so that the table plate performs 6 steps for a full revolution. To the extent so far described the turntable 10 is known in itself.

Figure 5:
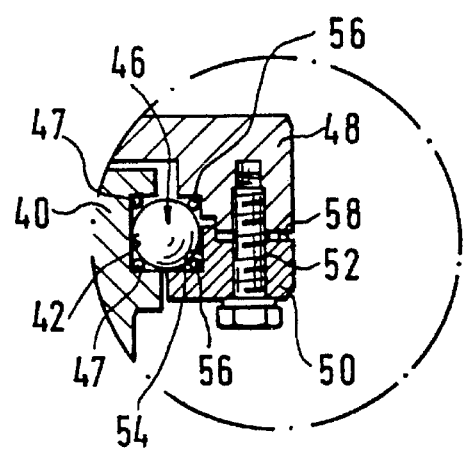
FIG. 5 shows an enlarged sectional view of the bearing area of the table plate on the housing, that is situated within the broken circle 5 in FIG. 4.

What is new, however, is the manner in which the table plate 12 is mounted on the housing 14, and this mounting is represented in FIGS. 1 and 4 and especially in FIG. 5.

The housing 14 has in its upper portion on which the table plate 12 is mounted an upwardly projecting bearing section 40 which is of circular shape in plan, and into whose outer circumferential surface a groove 42 is cut which accommodates hardened rings 47 of steel wire serving as races on the housing side for the balls 44 of a wire ball bearing 46.

The turntable 12, which is of greater diameter than the outside diameter of the bearing section 40, is of greater thickness in the downward direction in its area reaching radially beyond the bearing section, so that an outer circumferential margin 48 is formed which overlaps vertically approximately the upper half of the housing's bearing section 40. Against the bottom face of the outer marginal portion 48 of table plate 12 a bearing ring 50 is fastened by means of screws 52 and it additionally overlaps approximately the lower half of the bearing section 40 of the housing 14. In the inside surface of the marginal portion 48 facing the bearing section 40 and the inside surface of the bearing ring 50, a groove 54 is made in alignment with groove 42—about one-half of the groove in each—which receives the wire rings 56 forming the races on the table plate side for the bearing balls 44 of the wire ball bearing 46, one of the wire rings 56 being disposed in the portion of groove 54 that is formed in the marginal part 48 of the table plate 12, and the other in the portion of groove 54 that is created in the bearing ring 50. The bearing ring 50 is screwed, with the interposition of thin, annular shims 58, to the bottom face of marginal portion 48 of table plate 12; by using shims of different thickness a largely clearance-free mounting of the table plate 12 on the bearing section 40 of the housing 14 can be established without the need for dismounting the table plate 12 for this purpose. To dismount the table plate 12, the bearing ring 50 is unscrewed from the table plate, and then the table plate can be lifted upwardly.

It is evident that, with the bearing arrangement described, contamination of the bearings by particles or fluids entering from above is impossible. Furthermore, the ball bearing can be adjusted from the outside under load, without removing any tool plate or individual tools that may be fastened on the table plate.

What is claimed is:

1. A bearing system for a turntable (10) with a stepping drive, the turntable having a circularly defined table plate (12), journaled on the upper side of a housing, from the bottom of the table plate a plurality of drive pins (36) project which are disposed at uniform angular distances on the same diameter, and which engage a control groove (34) in a drive cylinder (32) mounted in the housing (14) and motor-driven, the course of the control groove (34) determining the characteristic of the rotatory movement of the table plate (12), and wherein the circularly defined table plate (12) has a diameter that is greater than the associated upper part, likewise circularly defined, of the housing (14), wherein said bearing system comprises;

the housing (14);

an outer table plate margin (48), overreaching radially beyond the housing and having an increasing thickness downwardly such that it slightly overlaps downwardly a bearing area (14) of the housing (40);

a bearing ring (50), removably fastened on the downwardly facing surface of the outer table plate margin (48) reaching downwardly past the housing (14) in the bearing area, and a bearing race for ball bearings (46) for the table plate wherein said bearing race comprises;

housing-side races (42) formed in the radially outwardly facing wall of the housing (14) in the bearing area (40), an inner surface of the outer table plate margin (48) opposite the housing-side races in the housing (14); and the bearing ring (50).

2. The bearing system according to claim 1, wherein the housing side races for the ball bearings (46) are formed by two rings (47) of hardened steel wire which are separated vertically and disposed in a groove (42) in an upper portion of bearing area (40) of the housing (18), and the races of the ball bearing (46) on the inner surface of the outer table plate margin are formed by two rings (56) of hardened steel wire which are separated vertically and disposed in a groove (54) formed partly in the inside, facing the housing (14), of the downwardly reaching table plate margin (48) of the table plate (12), and partly in the bearing ring (50).

* * * * *